US008111951B2

(12) United States Patent
Kim (10) Patent No.: US 8,111,951 B2
(45) Date of Patent: Feb. 7, 2012

(54) APPARATUS AND METHOD FOR DETECTING TARGET IMAGE

(75) Inventor: Yury Kim, Yuzhno-Sahalinsk (RU)

(73) Assignee: Mutual IP Services, Inc., Kangnam-Ku, Seoul (KR)

( * ) Notice: Subject to any disclaimer, the term of this patent is extended or adjusted under 35 U.S.C. 154(b) by 726 days.

(21) Appl. No.: 12/211,279

(22) Filed: Sep. 16, 2008

(65) Prior Publication Data

US 2010/0023961 A1     Jan. 28, 2010

(30) Foreign Application Priority Data

Jul. 28, 2008    (KR) .................. 10-2008-0073711

(51) Int. Cl.
    *G06K 9/60*       (2006.01)
    *G06K 9/54*       (2006.01)
(52) U.S. Cl. ............ 382/305; 382/100; 382/224; 725/2; 725/44; 725/91; 725/114; 725/143
(58) Field of Classification Search .......... 382/100, 382/224–228, 305–306; 725/2, 44–61, 91–104, 725/114–115, 143–145
See application file for complete search history.

(56) References Cited

U.S. PATENT DOCUMENTS

| | | | | |
|---|---|---|---|---|
| 5,872,865 A * | 2/1999 | Normile et al. | ............... | 382/224 |
| 5,963,670 A * | 10/1999 | Lipson et al. | ................. | 382/224 |
| 5,995,095 A * | 11/1999 | Ratakonda | .................... | 715/255 |
| 6,373,979 B1 * | 4/2002 | Wang | ............................ | 382/165 |
| 6,389,168 B2 * | 5/2002 | Altunbasak et al. | .......... | 382/224 |
| 6,631,522 B1 * | 10/2003 | Erdelyi | ........................... | 725/53 |
| 6,665,442 B2 * | 12/2003 | Sekiguchi et al. | ............ | 382/224 |
| 6,697,523 B1 * | 2/2004 | Divakaran et al. | ............ | 382/173 |
| 6,751,354 B2 * | 6/2004 | Foote et al. | .................... | 382/224 |
| 7,151,852 B2 * | 12/2006 | Gong et al. | ................... | 382/173 |
| 7,152,209 B2 * | 12/2006 | Jojic et al. | ...................... | 715/720 |
| 7,158,674 B2 * | 1/2007 | Suh | ............................... | 382/170 |
| 7,170,566 B2 | 1/2007 | McGee et al. | | |
| 7,203,366 B2 * | 4/2007 | Miyatake et al. | ............. | 382/190 |
| 7,657,102 B2 * | 2/2010 | Jojic et al. | ...................... | 382/224 |
| 7,735,104 B2 * | 6/2010 | Dow et al. | ........................ | 725/52 |
| 7,783,106 B2 * | 8/2010 | Cooper et al. | ................ | 382/173 |
| 2002/0015105 A1 | 2/2002 | Abe et al. | | |
| 2003/0192058 A1 * | 10/2003 | Miyatake et al. | ............. | 725/115 |
| 2004/0013401 A1 | 1/2004 | Kasutani et al. | | |

FOREIGN PATENT DOCUMENTS

| | | |
|---|---|---|
| GB | 2 360 160 | 9/2001 |
| JP | 2001-313898 A | 11/2001 |
| JP | 2001-313960 A | 11/2001 |
| JP | 2003-047031 A | 2/2003 |
| JP | 2005-198326 A | 7/2005 |

(Continued)

*Primary Examiner* — Manav Seth (74) *Attorney, Agent, or Firm* — Lexyoume IP Group, PLLC (57) ABSTRACT

The present invention relates to a target image detecting apparatus and a method thereof. According to the present invention, the target video detecting apparatus calculates a video index for each frame of an input broadcasting signal, and compares a video index of an advertisement signal to be detected with the calculated video index of each frame of the broadcasting signal. In addition, the target video detecting apparatus detects a predetermined sequence of frames having video indexes that match a sequence of video indexes of the advertisement signal from the broadcasting signal. In addition, the target video detecting apparatus compares video indexes from a start frame of the detected plurality of frames and the corresponding frame of the advertisement signal in order to detect an advertisement signal from the broadcasting signal.

9 Claims, 9 Drawing Sheets

FOREIGN PATENT DOCUMENTS

| | | |
|---|---|---|
| JP | 18-139608 | 1/2006 |
| JP | 2007-266653 | 10/2007 |
| KR | 10-1999-0016894 | 3/1999 |
| KR | 10-2000-0076565 | 12/2000 |
| KR | 10-2001-0026397 | 4/2001 |
| KR | 1020060059127 | 6/2006 |
| WO | 02-065782 | 8/2002 |
| WO | WO-2004/030350 | 4/2004 |

\* cited by examiner

| Broadcasting signal | |
|---|---|
| Frame number | Video index |
| 123 | 230 |
| 124 | 15 |
| 125 | 578 |
| 126 | 1234 |
| 127 | 95 |

| Advertisement signal | |
|---|---|
| Frame number | Video index |
| 5 | 795 |
| 6 | 15 |
| 7 | 578 |
| 8 | 1234 |
| 9 | 2467 |

| Start frame number | |
|---|---|
| Candidate video signal | Advertisement signal |
| 124 | 6 |

APPARATUS AND METHOD FOR DETECTING TARGET IMAGE

CROSS-REFERENCE TO RELATED APPLICATION

This application claims priority to and the benefit of Korean Patent Application No. 10-2008-0073711 filed in the Korean Intellectual Property Office on Jul. 28, 2008, the entire contents of which are incorporated herein by reference.

BACKGROUND OF THE INVENTION (a) Field of the Invention

The present invention relates to a target image detecting apparatus and a method thereof.

(b) Description of the Related Art

The number of broadcasts of a specific advertisement is used as important research data for business marketing. Therefore, a company that has requested broadcast of an advertisement for the company on a television broadcasting station may request data that includes the number of times the company's advertisement has been broadcasted by the broadcasting station.

Conventionally, specific advertisement broadcasting is searched by the naked eye by replaying a recorded program in order to detect only the specific advertisement during broadcasting. However, this method has problems in that a search result depends on the capability of an operator who performs the searching process, and a personal expense of the operator causes a high cost.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a target video detecting apparatus for efficiently detecting an advertisement signal from a broadcasting signal, and a method thereof.

An exemplary target video detecting apparatus according to an embodiment of the present invention includes: an input video index database (DB) that stores a video index for each frame of an input video signal; a target video index DB that stores a video index for each frame of a target video signal; a video index calculator that classifies each frame of the input video signal into a plurality of segments, calculates a video index of each frame of the input video signal by combining difference values of representative brightness values of the plurality of segments, and stores the calculated video index in the input video index DB; and a detection unit that detects a plurality of frames that are expected to be a target video signal from the input video signal by comparing a video index of the input video signal and a video index of the target video signal and detects the target video signal from the input video signal by comparing video indexes from a start frame of the plurality of detected frames and a frame of the target video signal, which corresponds to the start frame.

An exemplary method for detecting a target video signal to be detected from an input video signal by a detecting apparatus according to another embodiment of the present invention includes: calculating a video index by using a representative brightness value of a plurality of segments classified from each frame of the input video signal; comparing a video index of the input video signal and a video index of the target video signal, and detecting a candidate video signal having video indexes that are sequentially matching video indexes of the target video signal among the input video signal during a predetermined number of frames; and verifying whether the candidate video signal is the target video signal by comparing from a start frame of the candidate video signal and the corresponding frame of the target video signal.

An exemplary method for detecting a target video signal from an input video signal by a detecting apparatus according to another embodiment of the present invention includes: calculating a video index by using a representative brightness value of a plurality of segments classified from each frame of the input video signal; searching a portion at which a predetermined number of video indexes are sequentially repeated among video indexes of the input video signal and detecting a start frame of each of repeating portions; comparing video indexes that correspond to each other while respectively incrementing frame numbers from the start frame of each of the repeating portions and determining whether the repeating portion is a target video signal; and when the repeating portion is determined to be the target video signal, storing a sequence of video indexes during a predetermined number of frames from the start frame of the repeating portion as video indexes of the target video signal.

In addition, a recording medium according to another embodiment of the present invention stores a program for performing a target video detection method and is readable by a computer. The target video detection method includes: calculating a video index by using a representative brightness value of a plurality of segments classified from each frame of an input video signal; comparing a video index of the input video signal and a video signal of a target video signal, and determining a candidate video signal of which video indexes are sequentially identical with video indexes of the target video signal during a predetermined number frames among the input video signal; and comparing video indexes from a start of the candidate video signal and a frame of the target video signal that corresponds to the start frame, and verifying whether the candidate video signal is the target video signal.

According to the present invention, time taken for detecting a target video signal can be reduced.

In addition, the target video signal can be effectively detected even though quality of a target video signal included in an input video signal is changed due to environmental factors.

In addition, reliability of a verification result can be increased.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components, software components, and combinations thereof.

A target image detecting apparatus and a method thereof according to an exemplary embodiment of the present invention will be described in further detail with reference to the accompanied drawing.

In the following description, an input video signal that is input to a target video detecting apparatus is a broadcasting signal that includes at least one advertisement video signal, and a target video signal that is to be detected by the target video detecting apparatus is an advertisement signal. However, the present invention is not limited thereto, and video contents of a specific type that is other than an advertisement signal can be detected from input video signals of different types according to the present invention.

Figure 1:
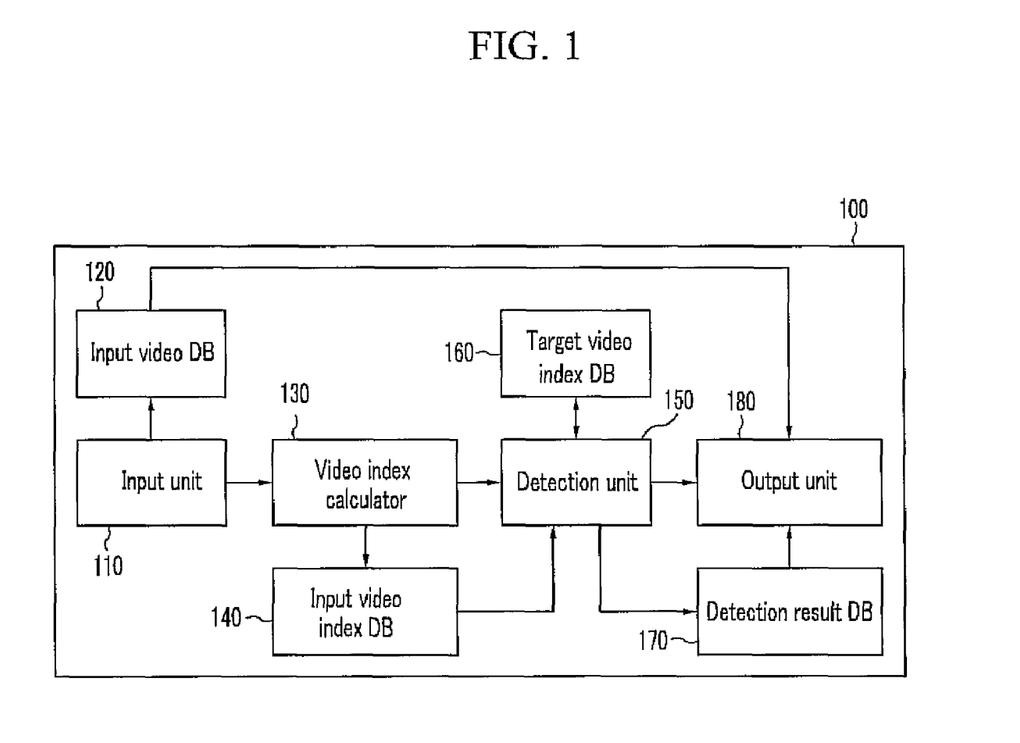
FIG. 1 is a configuration diagram of a target image detecting apparatus according to an exemplary embodiment of the present invention.

FIG. 1 is a configuration diagram of a target video detecting apparatus 100 according to an exemplary embodiment of the present invention. The target video detecting apparatus 100 can be installed in a television, a set-top box, a desktop computer, a laptop computer, a palmtop computer, a personal digital assistant (PDA), a video storage device such as a video cassette recorder (VCR), a digital video recorder (DVR), and other video processing devices.

Referring to FIG. 1, the target video detecting apparatus 100 includes an input unit 110, an input video database (DB) 120, an video index calculator 130, an input video index DB 140, a detection unit 150, a target video index DB 160, a detection result DB 170, and an output unit 180.

The input unit 110 converts a broadcasting signal in an analog format to a digital format and outputs a broadcasting signal in the digital format. In addition, the input unit 110 stores the digital broadcasting signal in the input video DB 120 for each frame. Here, if a broadcasting signal is an analog signal or an uncompressed digital signal, the input unit 110 reduces the size of the broadcasting signal to be stored in the input video DB 120 by compressing the broadcasting signal with a codec such as the moving picture experts group (MPEG)-4 or the H.264 so as to reduce the memory size of the input video DB 120. However, if an input broadcasting signal is a compressed digital signal, the input unit 110 decodes the digital signal to its original video signal and outputs the video signal, and stores the compressed broadcasting signal in the input video DB 120.

The video index calculator 130 classifies each frame of a broadcasting signal output from the input unit 110 into a plurality of segments, and determines a representative brightness value of each segment. Here, an average brightness value or a middle brightness value of pixels included in each segment can be used as the representative brightness value of each segment.

When the representative brightness value of each segment is determined, the video index calculator 130 calculates difference values between representative brightness values of adjacent segments of the plurality of segments. The video index calculator 130 generates a video index of the corresponding frame by combining the calculated difference values. In addition, the video index calculator 130 stores a calculated video index for each frame number in the input video index DB 140.

The detection unit 150 reads a video index of each frame of an advertisement signal to be detected from the target video index DB 160 and compares the read video index with a video index of each frame of a broadcasting signal that is stored in the input video index DB 140 so as to detect a plurality of frames that is expected to be an advertisement signal to be detected from an input broadcasting signal. That is, the detection unit 150 compares a video index of a broadcasting signal with a video index of an advertisement signal, and when the video indexes are sequentially identical for a predetermined number of frames, the detection unit 150 determines the corresponding frames of the broadcasting signal to be a candidate video signal. A video index of each frame of an advertisement signal stored in the target video index DB 160 is generated by the same method as the method for generating a video index for each frame of a broadcasting signal.

As described, when the candidate video signal is detected from the broadcasting signal, the detection unit 150 sequentially compares a video index of a start frame among a plurality of frames included in the candidate video signal with a video index of the frame of the advertisement signal so as to verify whether the candidate video signal is an advertisement signal to be detected. For the verification, the detection unit 150 compares video indexes while incrementing each frame number of the broadcasting and advertisement signals. In addition, the detection unit 150 determines whether the candidate video signal is an advertisement signal by calculating the number of frames of which a video index does not match a video index of the corresponding video index of the advertisement signal among the entire number of frames, and a ratio therebetween. In the verification process, it is determined whether two video indexes are identical of if they are identical to more than a predetermined level. In addition, video indexes of more than a minimum number of frames are compared in order to verify that the candidate video signal is the advertisement signal. The minimum number of frames for verification is determined in consideration of an advertisement signal type and an average number of frames of an advertisement signal.

When the verification process is finished, the detection unit 150 stores a detection result in the detection result DB 170. The detection result includes a start frame number of an advertisement signal that is detected from a broadcasting signal on the basis of a verification result of a candidate video signal, detection time, quality, and the number of times of detecting the corresponding advertisement signal from the broadcasting signal. Here, the quality of the detected advertisement signal can be obtained on the basis of a ratio of the entire number of frames of a candidate video signal of which video indexes are compared in the verification process to the number of frames having a video index determined to not be identical to a video index of the advertisement signal.

The detection unit 150 can also detect a new advertisement signal from an input broadcasting signal. When more than a predetermined number of video indexes are repeated among video indexes of the input broadcasting signal, the detection unit determines the possibility that the repeating portion is a broadcasting signal, and checks whether the repeating portion is a new broadcasting signal through a verification process. When it is determined to be a new advertisement signal the detection unit 150 stores video indexes of frames that are determined to be the advertisement signal in the target video index DB 160.

Upon a user's request, the output unit 180 outputs detection results that include a start frame number of an advertisement signal detected from an input broadcasting signal, detection time, quality, and the number of detection times, and displays an advertisement signal read from the input video DB 120 based on the start frame number of the detected advertisement signal. Accordingly, a manager can determine accuracy of the detection by checking the detected advertisement signal through video with the naked eye.

Figure 2:
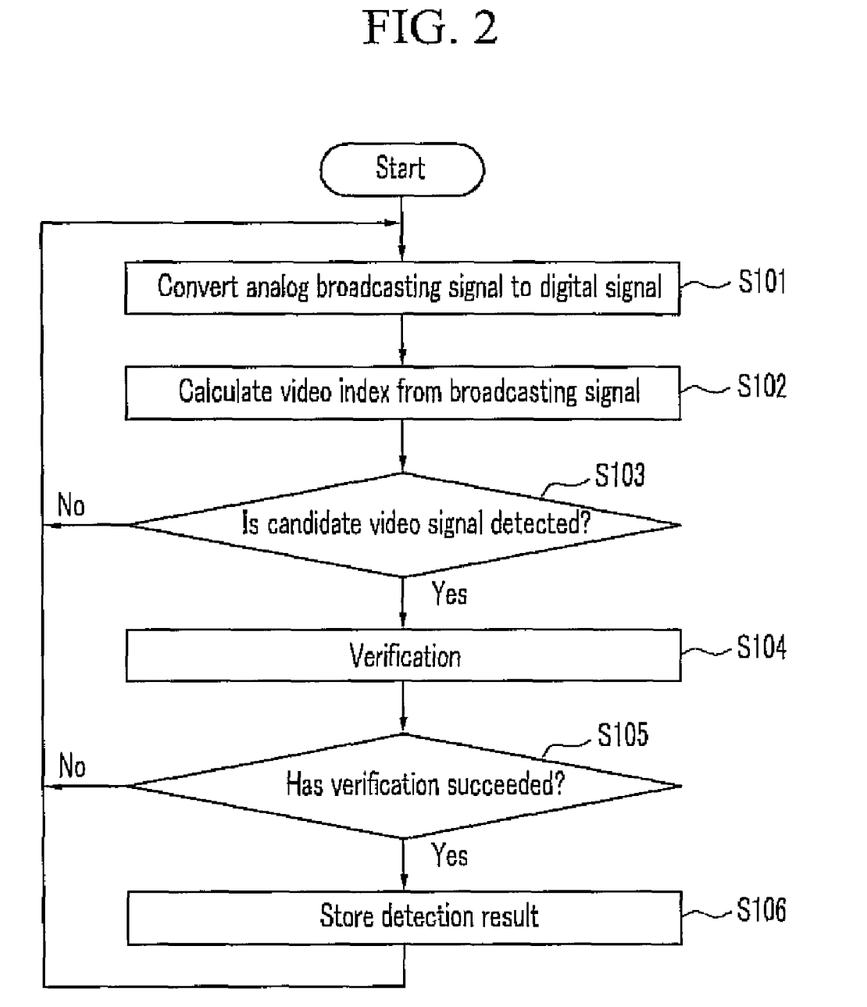
FIG. 2 is a flowchart of an advertisement signal detecting method of the target image detecting apparatus according to the exemplary embodiment of the present invention.

FIG. 2 is a flowchart showing an advertisement signal detection process of the target video detecting apparatus 100 according to the exemplary embodiment of the present invention.

Referring to FIG. 2, when an analog broadcasting signal is input, the input unit 110 converts the signal into a digital signal (S101), and the video index calculator 130 calculates a video index for each frame from the digital broadcasting signal (S102). Here, when the input broadcasting signal is not an analog signal, the conversion process (S101) can be omitted.

When the video index of each frame of the broadcasting signal is calculated, the detection unit 150 compares the video index of a frame of the input broadcasting signal and a video index of each frame of an advertisement signal to be detected, and detects a plurality of frames that are expected to be the advertisement signal as a candidate video signal (S103). That is, when video indexes of the broadcasting signal and video indexes of the advertisement signal to be detected are sequentially identical for a predetermined number of frames in the video index comparison, the corresponding frames of the broadcasting signal are determined to be a candidate video signal. In addition, a start frame of the corresponding frames of the broadcasting signal is determined to be a start frame of the candidate video signal.

When the candidate video signal is detected, the detection unit 150 compares video indexes while sequentially incrementing frame numbers from the start frame of the candidate video signal and the corresponding frame of the advertisement signal, respectively. Based on the comparison result, it is verified whether the candidate video signal is the advertisement signal (S104). When it is verified that the candidate video signal is the advertisement signal (S105), a detection result that includes a start frame number of the advertisement signal in the broadcasting signal, detection time, quality, and the number of times of detection is stored in the detection result DB 170 on the basis of the verification result (S106).

Figure 3:
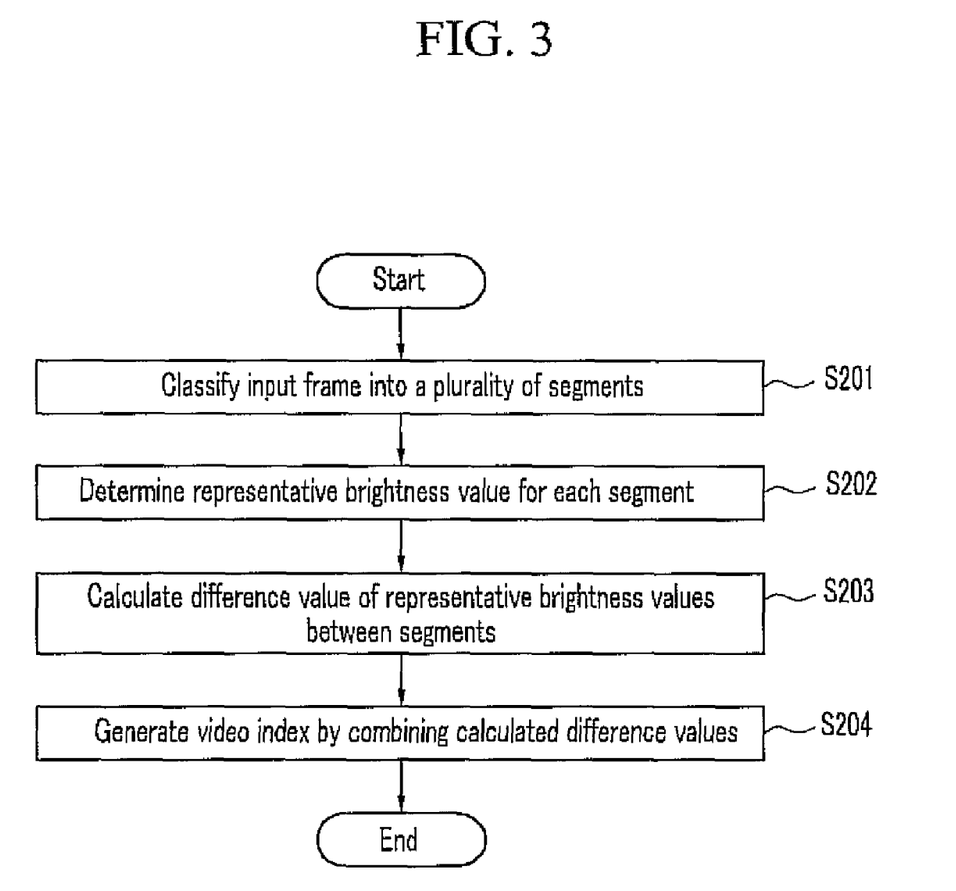
FIG. 3 is a flowchart of a process for calculating an image index for each frame of a broadcasting signal by an image index calculator according to the exemplary embodiment of the present invention.
Figure 4:
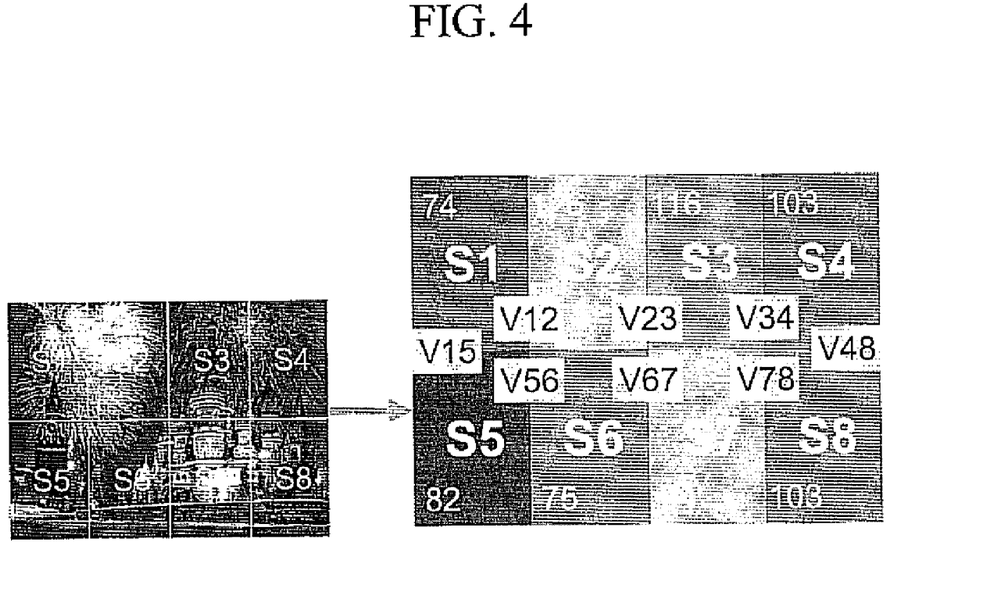
FIG. 4 shows an example of calculation of an image index according to the exemplary embodiment of the present invention.

FIG. 3 is a flowchart showing a method of the video index calculator 130 for calculating a video index for each frame of the broadcasting signal, and FIG. 4 shows one example of calculation of a video index according to the exemplary embodiment of the present invention.

Referring to FIG. 3, when a broadcasting signal is input, the video index calculator 130 classifies each frame of the broadcasting signal into a plurality of segments (S201). Here, the number of segments is predetermined. In FIG. 4, as an example, the video index calculator 130 classifies one frame into eight segments S1, S2, . . . , S8.

Referring back to FIG. 3, when the segment classification is finished, the video index calculator 130 determines a representative brightness value for each segment (S202). Here, the representative brightness value of each segment can be an average brightness value or middle brightness value of pixels included in each segment.

When the representative brightness value of each segment is determined, the video index calculator 130 calculates a difference value $V_{ab}$ of representative brightness values of adjacent segments by using Equation 1 (S203).

$$V_{ab}=(2^8+(B_a-B_b))/2^{(9-D)} \qquad \text{(Equation 1)}$$

Here, $B_a$ and $B_b$ respectively denote representative brightness values of the a-th segment and the b-th segment, and D denotes the number of bits assigned to the difference value $V_{ab}$. In FIG. 4, as an example, a difference value between the representative brightness values of the first segment S1 and the second segment S2 can be calculated as V12=(256+74−126))/32=6, and a difference value between the representative brightness values of the fourth segment S4 and the eighth segment S8 can be calculated as V48=(256+(103−103))/32=8.

Referring to FIG. 3, when the difference value of the adjacent segments is calculated, the video index calculator 130 generates one video index for the corresponding frame by combining the calculated difference values (S204).

In FIG. 4, as an example, since the number of segments of each frame is 8, the video index VI can be generated as given in Equation 2.

$$VI=V_{12}+(V_{23}<<D)+(V_{34}<<(2 \times D))+(V_{48}<<(3 \times D))+ \\ (V_{56}<<(4 \times D))+(V_{67}<<(5 \times D))+(V_{78}<<(6 \times D))+ \\ (V_{15}<<(7 \times D)) \qquad \text{(Equation 2)}$$

Here, D denotes the number of bits assigned to each difference value, and >> denotes a shift operation. That is, $V_{23}$ is shifted to upper bits by D bits, and $V_{34}$ is shifted to upper bits by (2×D) bits. The video index VI is generated by adding the shifted difference values.

For example, when the number of bits assigned to the difference value is 4, the video index can be generated as given in Equation 3.

$$VI=V_{12}+(V_{23}<<4)+(V_{34}<<8)+(V_{48}<<12)+(V_{56}<<16)+ \\ (V_{67}<<20)+(V_{78}<<24)+(V_{15}<<28) \qquad \text{(Equation 3)}$$

When the video index is generated as given in Equation 3, the video index can be represented with 32 bits as shown in Table 1. That is, $V_{12}$ is assigned to bit 0 to bit 3 of the video index, $V_{23}$, $V_{34}$, $V_{48}$, $V_{56}$, $V_{67}$, $V_{78}$, and $V_{15}$ are respectively shifted by 4, 8, 12, 16, 20, 24, and 28 bits so that they are respectively assigned to bit 4 to bit 7, bit 8 to bit 11, bit 12 to bit 15, bit 16 to bit 19, bit 20 to bit 23, bit 24 to bit 27, and bit 28 to bit 31 of the video index.

TABLE 1

Video index structure

| | Bit address | | | | | | | |
|---|---|---|---|---|---|---|---|---|
| | 0-3 | 4-7 | 8-11 | 12-15 | 16-19 | 20-23 | 24-27 | 28-31 |
| $V_{ab}$ | $V_{12}$ | $V_{23}$ | $V_{34}$ | $V_{48}$ | $V_{56}$ | $V_{67}$ | $V_{78}$ | $V_{15}$ |

The combination order of difference values in Equation 2, Equation 3, and Table 1 are exemplarily set for description of the exemplary embodiment of the present invention, and different combination orders can be selected for generating video indexes according to the exemplary embodiment of the present invention.

Figure 5:
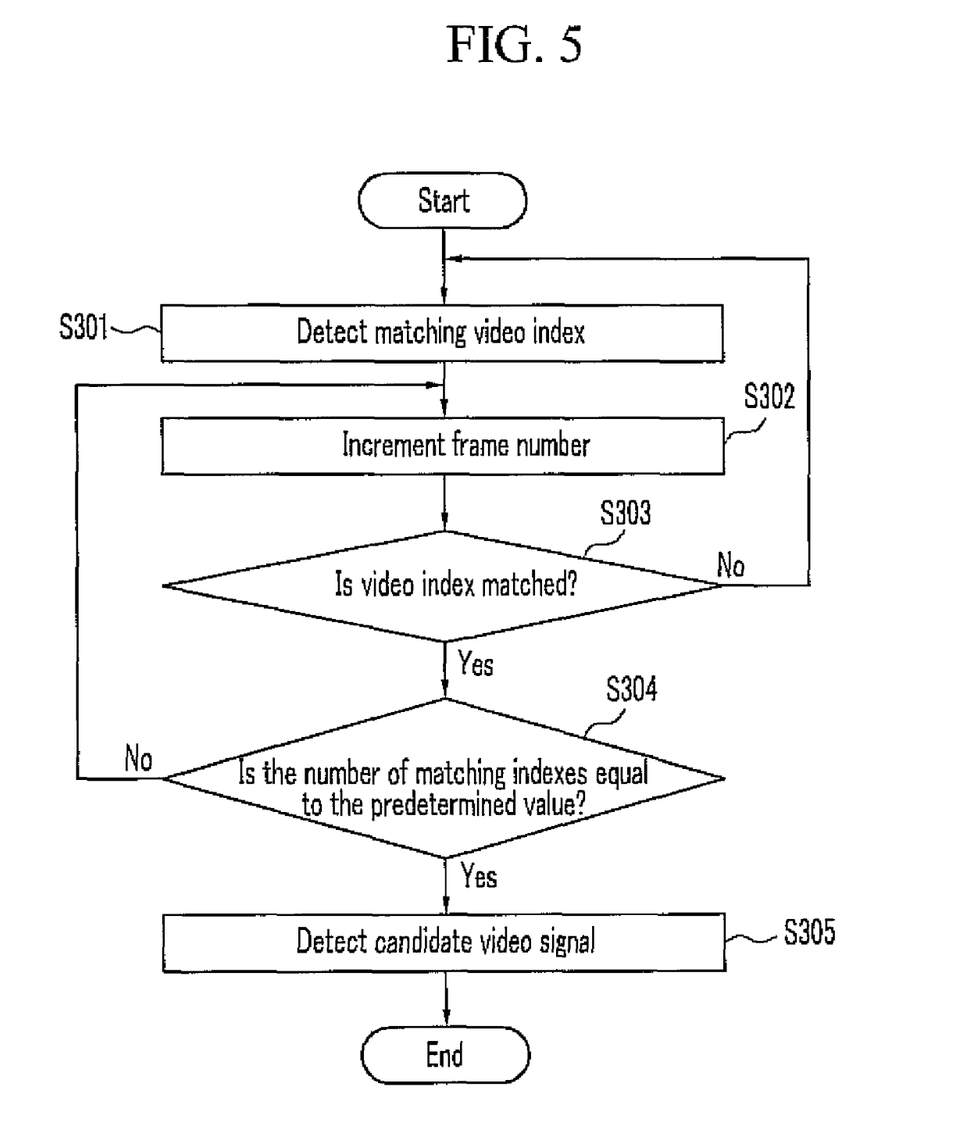
FIG. 5 is a flowchart of a candidate image signal detection process of a detection unit according to the exemplary embodiment of the present invention.
Figure 6:
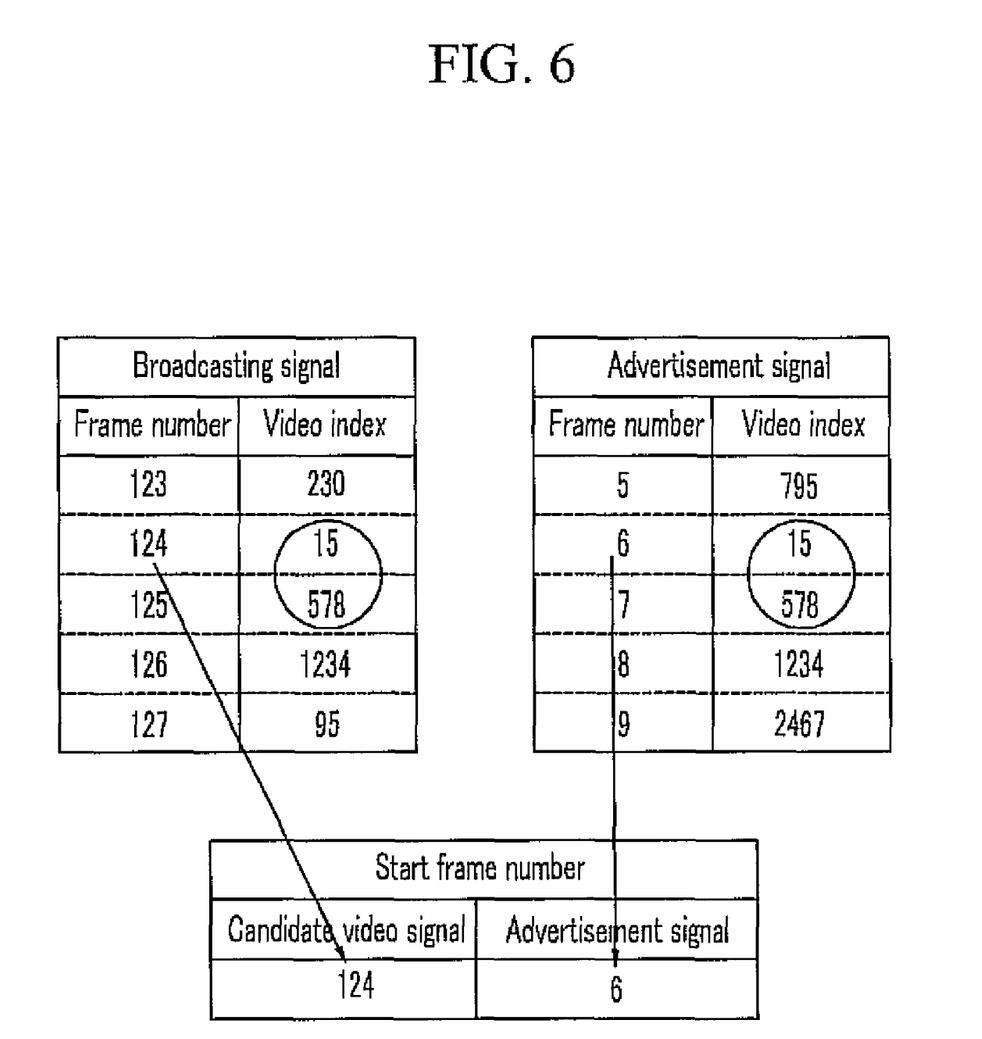
FIG. 6 shows an example of candidate image signal detection according to the exemplary embodiment of the present invention.

FIG. 5 is a flowchart showing a candidate video signal detection method of the detection unit 150 according to the exemplary embodiment of the present invention, and FIG. 6 shows one example of detection of a candidate video signal that is expected to be a target video signal according to the exemplary embodiment of the present invention.

Referring to FIG. 5, the detection unit 150 detects a video index that matches a video index of an advertisement signal to be detected among video indexes of an input broadcasting signal (S301). In FIG. 6, as an example, the detection unit 150 can perceive that a video index of the 6$^{th}$ frame of the advertisement signal matches a video index of the 124$^{th}$ frame of the broadcasting signal.

Referring to FIG. 2, when the matching video indexes are detected in the advertisement signal and the broadcasting signal, the detection unit 150 compares the corresponding video indexes of the advertisement and broadcasting signals while respectively incrementing frame numbers of the advertisement and broadcasting signals from the frames of the matching indexes (S303). When the video indexes match each other, frame numbers are incremented again for comparing video indexes, and when the video indexes do not match each other, the process returns to the detection of the matching video indexes (S301) and matching video indexes are detected from the next frame numbers. The comparison processes (S302 and S303) are iteratively performed until a predetermined number of frames having a matching video index is sequentially detected (S304). In addition, when video indexes of the advertisement and broadcasting signals sequentially match each other for the predetermined number of frames, the corresponding frames of the broadcasting signal are determined to be a candidate video signal (S305). Among a plurality of frames that are determined to be the candidate video signal, a start frame number and the corresponding frame number of the advertisement signal are stored. In FIG. 6, as an example, if it is assumed that two frames of the broadcasting signal are determined to be a candidate video signal when video indexes of the two frames are sequentially matching video indexes of the corresponding frames of the advertisement signal, the 124$^{th}$ and 125$^{th}$ frames of the broadcasting signal are determined to be the candidate video signal. In addition, a start frame number of the candidate video signal becomes 124 and the corresponding frame number of the advertisement signal becomes the frame number (i.e., 6) having the video index that matches the video index of the 124$^{th}$ frame of the broadcasting signal.

Figure 7:
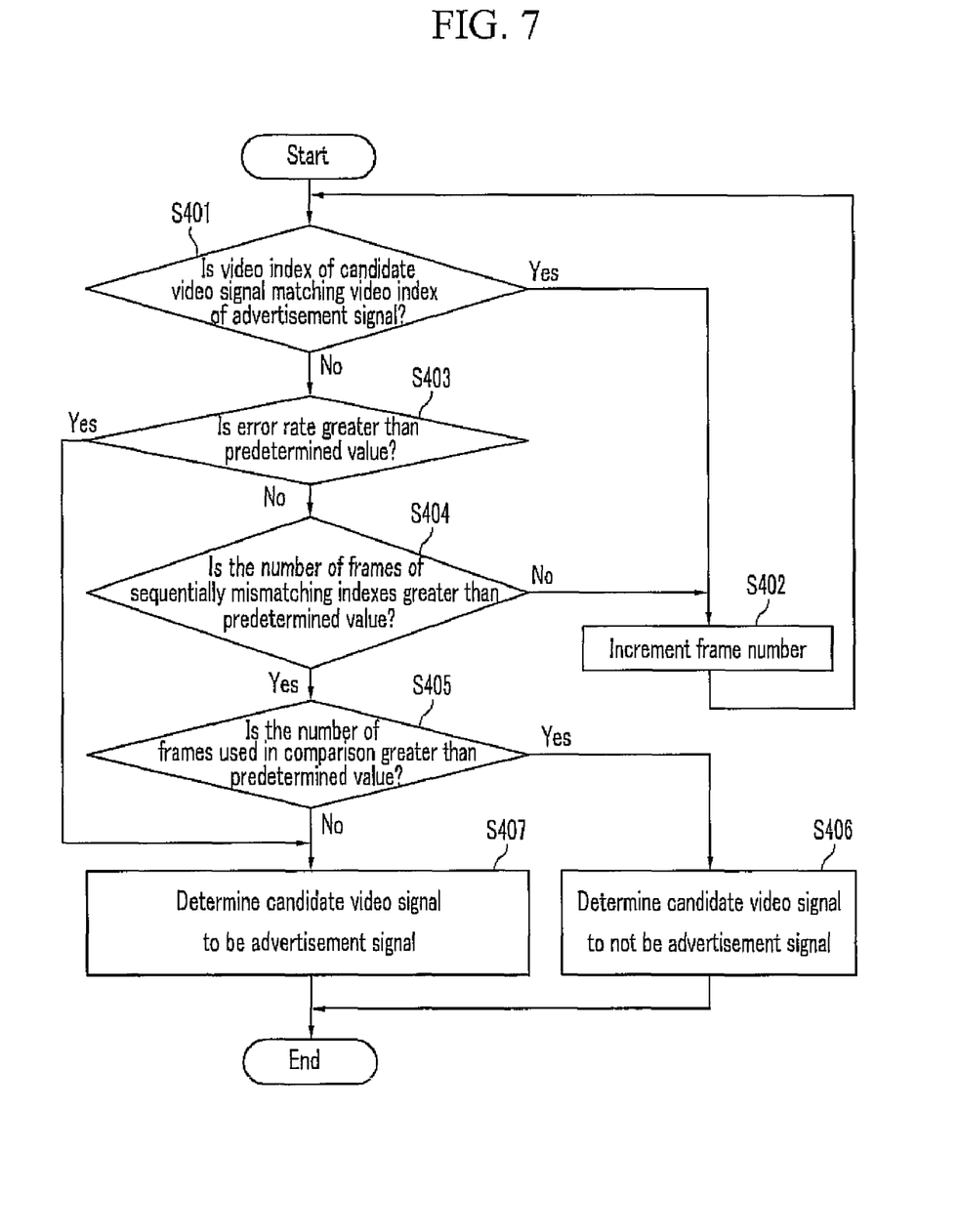
FIG. 7 is a flowchart of a candidate image signal verification process of the detection unit according to the exemplary embodiment of the present invention.

FIG. 7 is a flowchart showing a candidate video signal verification method of the detection unit 150 according to the exemplary embodiment of the present invention.

Referring to FIG. 7, the detection unit 150 compares whether a video index that corresponds to the start frame of the candidate video signal and a video index of a frame of the corresponding advertisement signal are identical to more than a predetermined level (S401). Here, the video index of the advertisement signal and the video index of the candidate video signal that are compared for verification can be represented by a combination of difference values representative brightness values of the respective segments as shown in Table 2 and Table 3.

TABLE 2

Video index structure of advertisement signal

| | Bit address | | | | | | | |
|---|---|---|---|---|---|---|---|---|
| | 0-3 | 4-7 | 8-11 | 12-15 | 16-19 | 20-23 | 23-27 | 28-31 |
| Value | $TV_1$ | $TV_2$ | $TV_3$ | $TV_4$ | $TV_5$ | $TV_6$ | $TV_7$ | $TV_8$ |

TABLE 3

Video index structure of candidate video signal

| | Bit address | | | | | | | |
|---|---|---|---|---|---|---|---|---|
| | 0-3 | 4-7 | 8-11 | 12-15 | 16-19 | 20-23 | 23-27 | 28-31 |
| Value | $CV_1$ | $CV_2$ | $CV_3$ | $CV_4$ | $CV_5$ | $CV_6$ | $CV_7$ | $CV_8$ |

Therefore, the detection unit 150 calculates a difference value of matching difference values in the difference values included in two video indexes as given in Equation 4, and uses the calculated difference value as a reference for determining identity between the two video indexes.

$$R_n = \text{ABS}(TV_n - CV_n) \quad \text{(Equation 4)}$$

$$E_n = \begin{cases} 0 & \text{if } R_n < X \\ 1 & \text{if } R_n \geq X \end{cases}$$

$$Z = E_1 \text{ or } E_2 \text{ or } E_3 \text{ or } E_4 \text{ or } E_5 \text{ or } E_6 \text{ or } E_7 \text{ or } E_8$$

Here, TVn denotes the n-th difference value among difference values included in video indexes of the advertisement signal, and CVn denotes the n-th difference value among difference values included in video indexes of the candidate video signal. In addition, as an absolute value of a difference value between TVn and CVn, Rn denotes a difference value of matching difference values among the difference values included in the video indexes of the advertisement and candidate video signals. En denotes an index value that indicates identity between the matching difference values among the difference values included in the video indexes of the advertisement and candidate video signals. Thus, when Rn is less than a threshold value X, two difference values are determined to be identical (En=0), and when Rn is greater than the threshold value X, the two difference values are determined to not be identical (En=1). Further, Z denotes an index value that indicates identity between two video indexes. Thus, if matching difference values are determined to not be identical at least once among the matching difference values, two video indexes are determined to not be identical. That is, if at least one of Ens is 1, two video indexes are determined to not be identical (Z=1), and if all En is 0, two video indexes are determined to be identical.

When two video indexes are determined to be identical through the above-described process, the detection unit 150 continuously checks identity between video indexes of the two signals (S401) while incrementing each frame number of the advertisement signal and candidate video signal (S402).

If a case in which two video indexes are determined to not be identical occurs during the identity comparison, the detection unit 150 checks if an error rate is greater than a predetermined value (S403).

Here, the error rate (Per) can be calculated by using Equation 5.

$$Per = (Er \times 100)/K \qquad \text{(Equation 5)}$$

Here, K denotes the number of identity comparisons of video indexes, and Er denotes the number of cases in which video indexes are determined to not be identical. That is, the error rate indicates a ratio of the number of all frames of a broadcast that is used for comparing identity with the advertisement signal and the number of frames of a broadcasting signal of which video index is determined to not be identical with the corresponding video index of the advertisement signal.

If it is determined that the error rate is greater than the predetermined value, the detection unit 150 determines that the candidate video signal is not an advertisement signal and terminates the identity comparison (S407). On the other hand, when it is determined that the error rate is less than the predetermined value, the detection unit 150 checks whether the number of sequentially mismatching frames of the candidate video signal is greater than a predetermined value if video indexes are sequentially mismatching (S404).

If the checking result shows that the number of sequentially mismatching frames of the candidate video signal is less than the predetermined value, the detection unit 150 increments the frame number (S402) and performs the identity comparison process (S401). When the number of sequentially mismatching frames of the candidate video signal is greater than the predetermined value, the detection unit 150 checks whether the entire number of sequentially mismatching frames of a candidate video signal that is used in the identity comparison is greater than the least number of frames that is required for verifying that the candidate video signal is an advertisement signal (S405). If the checking result shows that the entire number of sequentially mismatching frames of the candidate video signal that is used in the identity comparison is greater than the least number of frames that is required for verifying that the candidate video signal is an advertisement signal, the detection unit 150 determines the corresponding candidate video signal to be an advertisement signal (S406). That is, when the error rate resulting from the identity comparison process performed on the number of frames that is greater than a number of frames that is required for determining whether the candidate video signal is an advertisement signal is less than a predetermined value, the detection unit 150 determines the candidate video signal to be an advertisement signal.

When the entire number of frames used in the identity comparison is less than the least number of frames for the verification of the advertisement signal, the detection unit 150 determines the candidate video signal to not be an advertisement signal. That is, if the number of frames used for identity comparison is less than the number of frames that is required for determining whether the candidate video signal is the advertisement signal and when the number of frames of which a video index is not sequentially identical is greater than a predetermined value, the detection unit 150 determines that the candidate video signal is not the advertisement signal.

Figure 8:
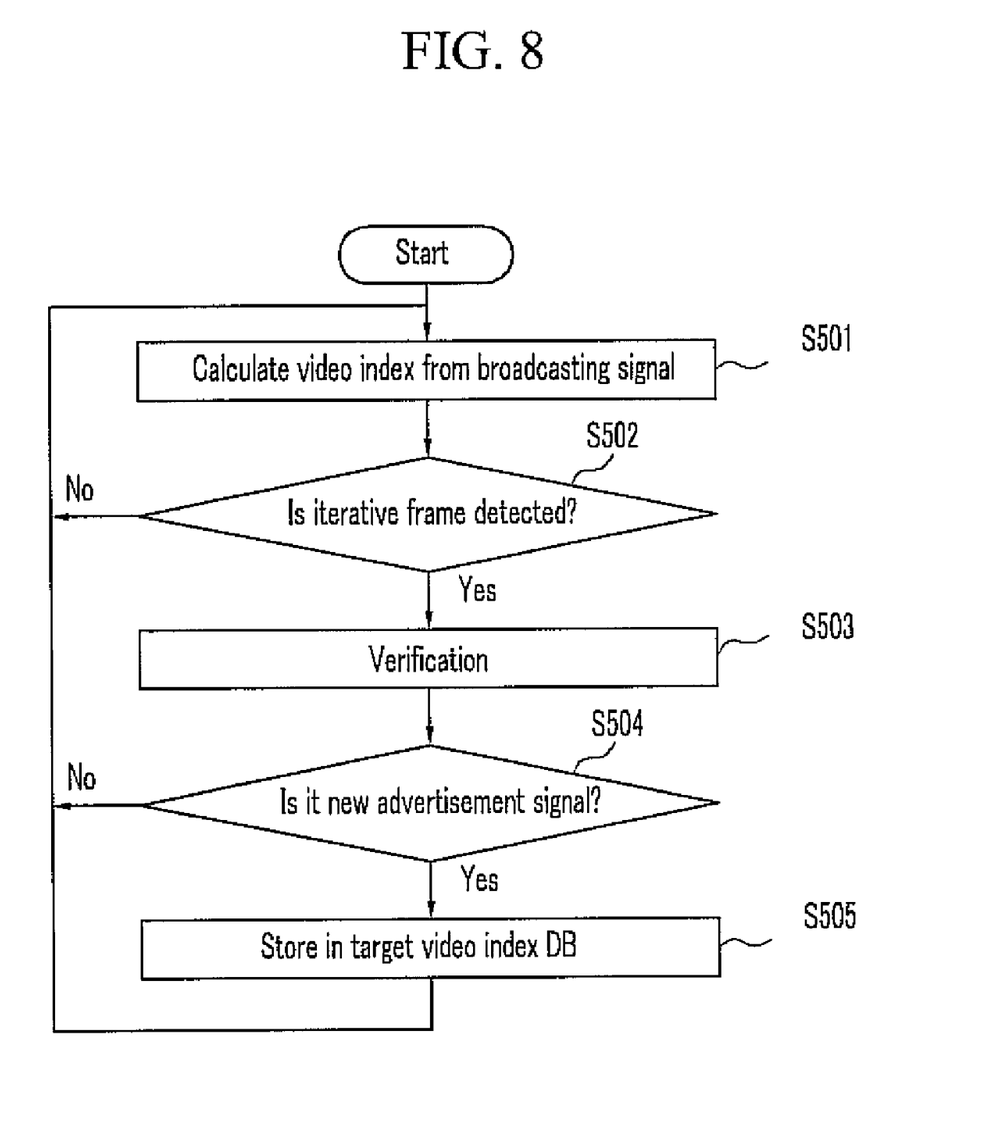
FIG. 8 is a flowchart of a process for detecting a new advertisement signal from a broadcasting signal by a target image detecting apparatus according to the exemplary embodiment of the present invention.
Figure 9:
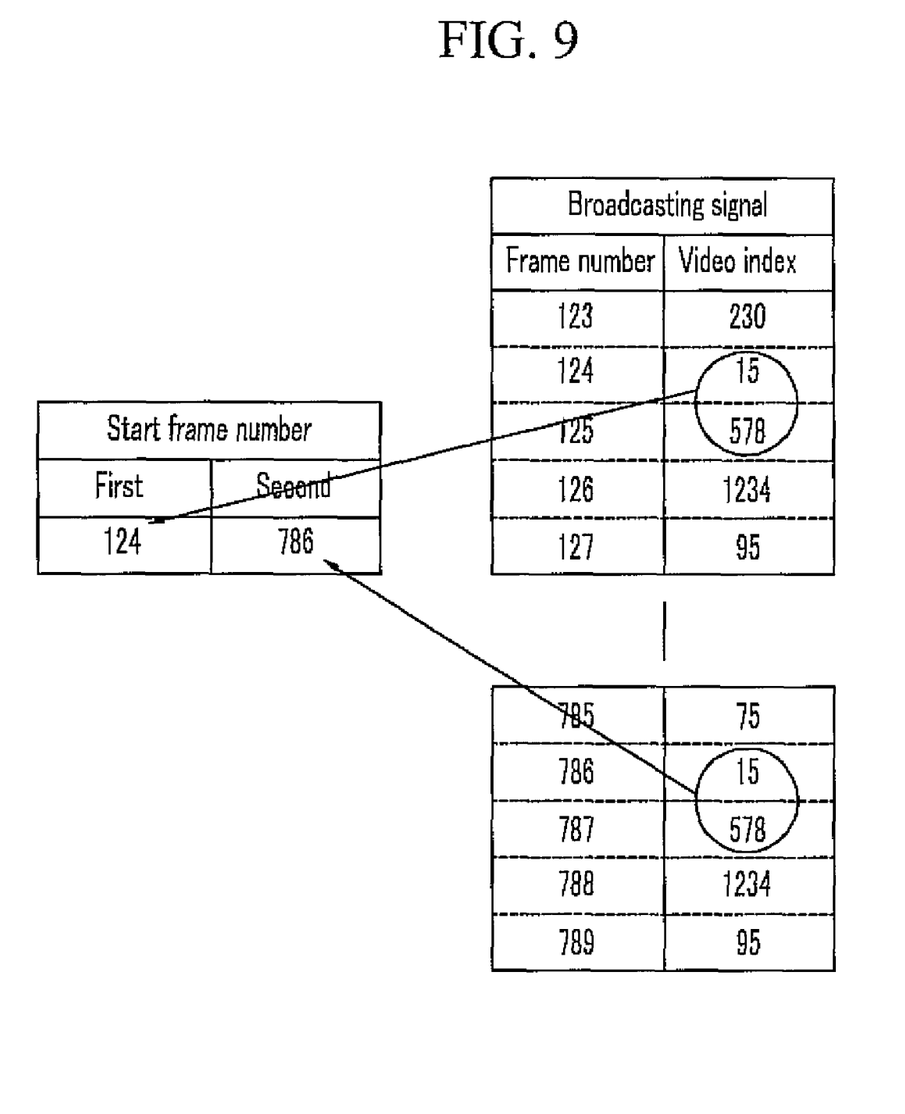
FIG. 9 shows an example of candidate image signal detection for a new advertisement signal search according to the exemplary embodiment of the present invention.

FIG. 8 is a flowchart of a method for detecting a new advertisement signal from a broadcasting signal performed by the target video detecting apparatus 100 according to the exemplary embodiment of the present invention and FIG. 9 is one example of candidate video signal detection for searching a new advertisement signal according to the exemplary embodiment of the present invention.

Referring to FIG. 8, when a broadcasting signal is input, the video index calculator 130 calculates a video index for each frame from the input broadcasting signal and stores the video index according to a sequence of frames in the input video index DB 140 (S501). In addition, a portion of which a predetermined number of video indexes are sequentially repeated is searched among video indexes calculated on the basis of the frame order, and a start frame of each of the portions is detected if the portion exists (S502). That is, it is checked whether a predetermined number of video indexes is sequentially repeated twice or more by analyzing a video index for each frame that is calculated from the broadcasting signal, and when the predetermined number of video indexes is sequentially repeated, a start frame of each of the repeated portions is stored.

In FIG. 9, as an example, it is determined that video indexes 15 and 578 of the $124^{th}$ and $125^{th}$ frames match video indexes of the $786^{th}$ and $789^{th}$ frames, and these matching video indexes are repeated. Therefore, the $124^{th}$ and $125^{th}$ frames and the $786^{th}$ and $789^{th}$ frames are determined to be repeated portions, and start frame numbers 124 and 786 of each of the repeated portions are stored.

Referring back to FIG. 8, the detection unit 150 respectively increments frame numbers from the start frames of the repeated portions, and compares the corresponding video indexes for verifying whether the repeated portion is an advertisement signal (S503). That is, the detection unit 150 increments a frame number from the start frame of each of the repeated portions, and compares the corresponding video indexes. In addition, when video indexes of more than the least number of frames that are required for advertisement signal verification are compared with each other, and the comparison result shows that an error rate is less than a predetermined value, the repeated portions are determined to be an advertisement signal. Here, the error rate indicates a ratio of the number of comparisons to the number of times that video indexes are determined to not be identical. Such a verification process is similar to the previously-described verification process (S401 to S407) of FIG. 7, and therefore a detailed description will be omitted.

When the verification result shows that the repeated portions are determined to be the advertisement signal, the detection unit 150 selects one of the repeated portions and compares the selected one with advertisement signals stored in the target video index DB 160 so as to determine whether the detected advertisement signal is a new advertisement signal (S504). Here, a process for comparing the detected advertisement signal with the stored advertisement signals is similar to the above-described verification process (S401 to S407) of FIG. 7, and therefore a detailed description will be omitted.

When the detected advertisement signal is determined to be a new advertisement signal, the detection unit 150 selects one from the repeated portions. In addition, the detection unit 150 extracts video indexes of the least number of frames that are required for advertisement signal verification from a start frame of the selected repeated portion from the input video index DB 140m, and stores the extracted video indexes as video indexes of the new advertisement signal in the target video index DB (S505). The stored video indexes will be used as reference data for detecting the corresponding advertisement signal.

As described, the target video detecting apparatus according to the exemplary embodiment of the present invention classifies each frame into a plurality of segments, detects a candidate video signal that is expected to be a target video signal from input video signals by comparing video indexes calculated by using representative brightness values of the plurality of segments, and verifies whether the detected candidate video signal is a target video signal, so that the target video detecting apparatus can reduce time taken for a target video signal detection process.

In addition, by using difference values between representative brightness values of a plurality of segments for the video index calculation process, a target video signal can be effectively detected even though the quality of a target video signal included in an input video signal is changed due to environmental factors.

Further, after roughly detecting a candidate video signal that is expected to be a target video signal from input video signals, it is checked again whether the detected candidate video signal is an advertisement signal through a verification process to thereby increase reliability of the verification result.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A target video detecting apparatus comprising: an input video index database (DB) that stores a video index for each frame of an input video signal; a target video index DB that stores a video index for each frame of a target video signal; a video index calculator that classifies each frame of the input video signal into a plurality of segments, calculates a video index of each frame of the input video signal by combining difference values of representative brightness values of the plurality of segments, and stores the calculated video index in the input video index DB; and a detection unit that detects a plurality of frames that are expected to be a target video signal from the input video signal by comparing a video index of the input video signal and a video index of the target video signal, and detects the target video signal from the input video signal by comparing video indexes from a start frame of the plurality of detected frames and a frame of the target video signal, which corresponds to the start frame.

2. The target video detecting apparatus of claim 1, further comprising an analog-to-digital (AD) conversion unit that converts the input video signal in an analog format into a digital format and outputs the digital video signal to the video index calculator.

3. The target video detecting apparatus of claim 1, further comprising a detection result DB for storing detection results of the target video signal, wherein the detection unit generates the detection results that include at least one of a start frame number of the detected target video signal, detection time, and the number of times that the target video signal is detected when the target video signal is detected from the input video signal.

4. The target video detecting apparatus of claim 3, further comprising:
an input video DB that stores the input video signal for each frame; and an output unit that reads frames detected as the target video signal from the input video DB on the basis of the detection result and displays the read frames.

5. The target video detecting apparatus of claim 3, wherein the detection unit compares a video index of the input video signal and a video index of the target video signal, and detects a plurality of frames having a predetermined sequence of frames that respectively match a sequence of frames of the target video signal video indexes among frames of the input video signal as a plurality of frames that are expected to be the target video signal.

6. The target video detecting apparatus of claim 5, wherein the detection unit performs identity comparison between a video index of a start frame of the plurality of detected frames and a video index of the corresponding frame of the target video signal, and detects the target video signal from the input video signal based on the number of times that the two indexes in the identity comparison are not matching among the number of times of performing the identity comparison.

7. The target video detecting apparatus of claim 6, wherein, in the identity comparison, the detection unit determines that the two video indexes in the identity comparison match each other if the two video indexes match each other more than a predetermined level.

8. The target video detecting apparatus of claim 1, wherein the representative brightness value is an average brightness value of pixels included in the corresponding segment.

9. The target video detecting apparatus of claim 1, wherein the representative brightness value is a middle brightness value of pixels included in the corresponding segment.

* * * * *